United States Patent
Ryszawa et al.

(10) Patent No.: US 11,858,391 B2
(45) Date of Patent: Jan. 2, 2024

(54) VEHICLE SEAT

(71) Applicants: Faurecia Autositze GmbH, Hannover (DE); Honda Motor Co. Ltd., Tokyo (JP)

(72) Inventors: Daria Ryszawa, Swiebodzice (PL); Wojciech Kowalewski, Drawno (PL); Lukasz Kunicki, Walbrzych (PL); Jacek Lasak, Jaroszów (PL); Aleksander Lwow, Wroctaw (PL); Fumiya Makiguchi, Tokyo (JP)

(73) Assignees: Faurecia Autositze GmbH, Hannover (DE); Honda Motor Co. Ltd., Tokyo (JP)

( * ) Notice: Subject to any disclaimer, the term of this patent is extended or adjusted under 35 U.S.C. 154(b) by 0 days.

(21) Appl. No.: 17/870,944

(22) Filed: Jul. 22, 2022

(65) Prior Publication Data
US 2023/0027678 A1 Jan. 26, 2023

(30) Foreign Application Priority Data
Jul. 23, 2021 (DE) .......................... 102021119131.9

(51) Int. Cl.
| | |
|---|---|
| *B60N 2/66* | (2006.01) |
| *B60N 2/64* | (2006.01) |
| *B60N 2/52* | (2006.01) |
| *A47C 4/54* | (2006.01) |
| *B60N 2/90* | (2018.01) |

(Continued)

(52) U.S. Cl.
CPC .............. *B60N 2/643* (2013.01); *B60N 2/525* (2013.01); *A47C 4/54* (2013.01); *A47C 7/467* (2013.01); *A47G 9/1027* (2013.01); *B60N 2/665* (2015.04); *B60N 2/914* (2018.02)

(58) Field of Classification Search
CPC ........ A47C 4/54; A47C 7/467; A47G 9/1027; B60N 2/525; B60N 2/665; B60N 2/914
See application file for complete search history.

(56) References Cited

U.S. PATENT DOCUMENTS

| | | | |
|---|---|---|---|
| 10,059,239 B2 * | 8/2018 | Jaranson ................. | B60N 2/665 |
| 10,279,719 B2 * | 5/2019 | Chiba .................... | B60N 2/914 |
| 10,358,065 B2 * | 7/2019 | McMillen .............. | B60N 2/665 |

(Continued)

FOREIGN PATENT DOCUMENTS

EP          1904338 B1      4/2008

*Primary Examiner* — Syed A Islam
(74) *Attorney, Agent, or Firm* — Laurence P. Colton; SMITH TEMPEL BLAHA LLC

(57) ABSTRACT

A motor vehicle seat having a backrest and a seat part, at least one flexible, fluid-fillable hollow body attached to the seat part or the backrest, and at least two chambers that are in fluid communication with one another. The chambers are arranged one on top of the other and have in their walls corresponding passages which enable a fluid exchange between the chambers. The chambers are firmly connected to one another in the region of the passages, wherein the volume of the lowermost chamber adjacent to the seat part or the backrest is the largest and the volume of each additional chamber is smaller compared with the volume of the chamber below it. The chambers are arranged one on top of the other such that the maximum lift of the fluid-fillable hollow body when it is being filled with fluid is outside the center of the lowermost chamber.

14 Claims, 3 Drawing Sheets

(51) Int. Cl.
  *A47G 9/10* (2006.01)
  *A47C 7/46* (2006.01)

(56) References Cited

U.S. PATENT DOCUMENTS

| | | | | |
|---|---|---|---|---|
| 10,372,125 | B2* | 8/2019 | Watanabe | B60W 50/16 |
| 10,479,248 | B2* | 11/2019 | Izukawa | B60N 2/914 |
| 10,696,202 | B2* | 6/2020 | Sedenka | B60N 2/7017 |
| 10,906,442 | B2* | 2/2021 | Klein | A61H 9/005 |
| 11,614,083 | B2* | 3/2023 | Kim | F15B 15/24 |
| | | | | 137/224 |
| 2014/0041125 | A1* | 2/2014 | Grealy | B60N 3/06 |
| | | | | 5/655.3 |
| 2014/0167460 | A1* | 6/2014 | Prexl | B60N 2/914 |
| | | | | 156/60 |
| 2017/0156505 | A1* | 6/2017 | Cheng | A47C 7/142 |
| 2018/0170230 | A1* | 6/2018 | Onuma | B60N 2/914 |
| 2018/0238355 | A1* | 8/2018 | Zabielski | B60N 2/665 |

\* cited by examiner

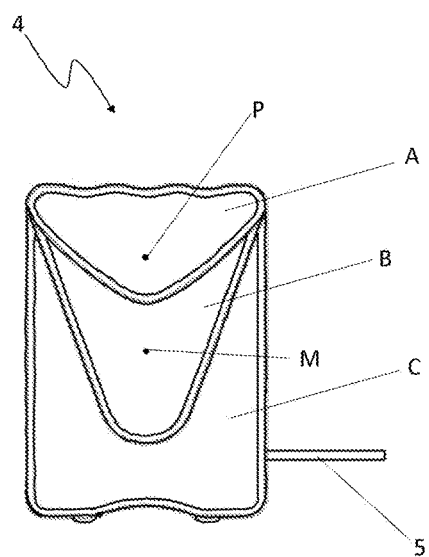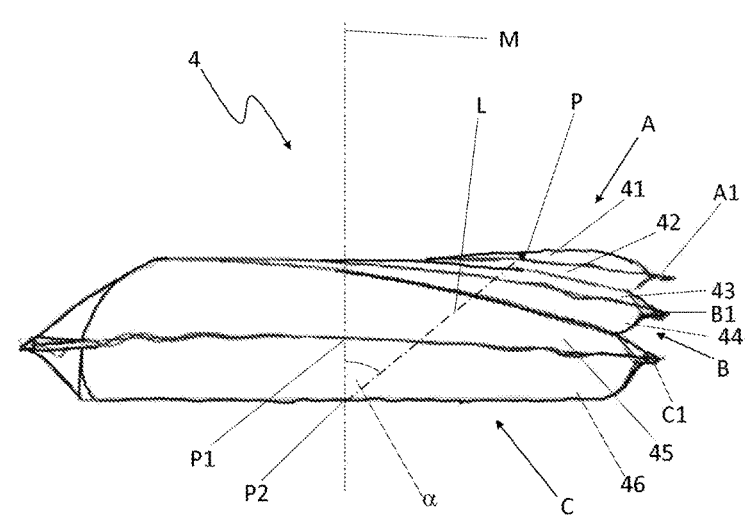
Fig. 3
Fig. 4

VEHICLE SEAT

CROSS REFERENCE TO RELATED APPLICATIONS

This patent application claims priority on and the benefit of German Patent Application No. 10 2021 119 131.9 having a filing date of 23 Jul. 2021.

BACKGROUND OF THE INVENTION

Technical Field

The invention relates to a motor vehicle seat.

Prior Art

Fluid-fillable hollow bodies are often used in corresponding seats in order to change settings in the seat area. In order to exert a corresponding lift, it is also known to use fluid-fillable hollow bodies that are formed by a plurality of chambers that lie one above the other and are connected to one another.

A pneumatic cushion structure is known from EP 1 904 338 B1, in which such a hollow body consists of a plurality of chambers lying one above the other and successively becoming smaller. These chambers are arranged one above the other and have aligned passages in the walls. The chambers are successively filled with air through these passages when said chambers are being filled, causing the entire cushion structure to perform a lift. Due to the concentric arrangement of the chambers, the maximum lift takes place in parallel with the center axis. This arrangement has disadvantages since the direction of the maximum lift and thus the maximum force application to the vehicle occupants, for example in the case of shoulder support systems in motor vehicle seats, does not correspond to the actual requirements in the arrangement described in EP 1 904 338 B1. The direction also remains constant over the entire lifting distance.

BRIEF SUMMARY OF THE INVENTION

It is therefore the object of the present invention to further develop a motor vehicle seat in such a way that the lift takes place in the correct direction when a corresponding hollow body is being inflated.

This object is achieved by a motor vehicle seat having a backrest and a seat part, having at least one flexible, fluid-fillable hollow body attached to the seat part or the backrest and having at least two chambers that are in fluid communication with one another, wherein the chambers are arranged one on top of the other and have in their walls corresponding passages which enable a fluid exchange between the chambers, wherein the chambers are firmly connected to one another in the region of the passages, wherein the volume of the lowermost chamber adjacent to the seat part or the backrest is the largest and the volume of each additional chamber is smaller compared with the volume of the chamber below it, wherein the chambers are arranged one on top of the other in such a way that the maximum lift of the fluid-fillable hollow body when it is being filled with fluid is outside the center of the lowermost chamber.

Advantageous embodiments can be found in the dependent claims.

The motor vehicle seat according to the invention, which comprises a backrest and a seat part, has at least one flexible fluid-fillable hollow body, which is attached to the seat part or the backrest, and has at least two chambers that are in fluid communication with one another. The fluid-fillable hollow body is preferably arranged on the backrest and forms part of a shoulder support system or shoulder massage system. The chambers are arranged one on top of the other, i.e., lie one above the other, and have corresponding passages in their walls which enable fluid exchange between the chambers. Air is preferably used as the fluid.

The chambers are firmly connected to one another in the region of the passages. For example, they can be welded together. Each chamber is preferably formed by two walls made of plastics film connected to one another circumferentially along an outer edge. Especially when using thermoplastic films, the walls can be welded together, resulting in the formation of individual chambers and the chambers also being connected to one another. Other forms of connection such as gluing are of course also possible.

The chambers become successively smaller, starting with the lowermost chamber, wherein the volume of the lowermost chamber adjacent to the seat part or the backrest is the largest and the volume of each additional chamber is smaller compared with the volume of the chamber below it. According to the invention, the chambers are arranged one on top of the other in such a way that the maximum lift of the fluid-fillable hollow body when it is being filled with fluid is outside the center of the lowermost chamber.

This eccentric lift ensures that the lift vector, i.e., the highest point of the chamber furthest away from the lowermost chamber, does not lie above the center point of the lowermost chamber during filling. In particular, a center point or a center axis that is perpendicular to one or both of the walls of the lowermost chamber in the unfilled state is considered to be the center. In this context, eccentric then means that the lift during filling of the hollow body takes place on a movement path, for example a straight line, which forms an angle relative to the center axis.

In terms of apparatus, this can be achieved, for example, in that at least one of the additional chambers has an approximately triangular or trapezoidal shape. It is preferably further provided that, in the unfilled state of the fluid-fillable hollow body, one side of the lowermost chamber and the base side(s) in the case of the triangular shape, or the longer of the base side(s) in the case of the trapezoidal shape, of the additional chamber(s), for example, are arranged one above the other. As a result, in the case of expansion when the hollow body is being filled, an asymmetrical lifting movement, i.e., a lifting movement not parallel to a center line, is achieved.

In order to fill the chambers with fluid, it is preferably provided that the lower wall of the lowermost chamber has at least one inlet opening connected to a fluid line. Of course, the other chambers can also have such an inlet opening, but the lowermost chamber has the advantage that it is attached to the seat and its position relative to the seat structure does not change, even during filling. Accordingly, the fluid lines do not move either, which simplifies their routing in the seat structure up to a pump or a valve block.

The fluid-fillable hollow body preferably has three chambers. In this way, on the one hand, a sufficient lifting distance is made available and, on the other hand, the filling time is not extended too much. Furthermore, the lowermost chamber can have an approximately rectangular shape. As a result, a plurality of inlet openings can be provided, which accelerate the filling of the chamber with the largest volume.

The number of passages between the chambers can be designed to decrease from the lowermost chamber to the uppermost chamber. In the case of the preferred three-chamber system, for example, two passages can be provided between the lowermost chamber and the chamber lying above it, and one passage can be provided between this and the uppermost chamber lying above it. Of course, the number of passages between the chambers is at the discretion of a person skilled in the art.

BRIEF DESCRIPTION OF THE DRAWINGS

The invention is explained in more detail below with reference to the embodiment illustrated in FIGS. 1 to 6.

FIG. 3 is a top view of a hollow body according to the invention in the unfilled state.

FIG. 4 is a side view of the hollow body according to the invention in the unfilled state.

DETAILED DESCRIPTION OF PREFERRED EMBODIMENTS

Figure 1:
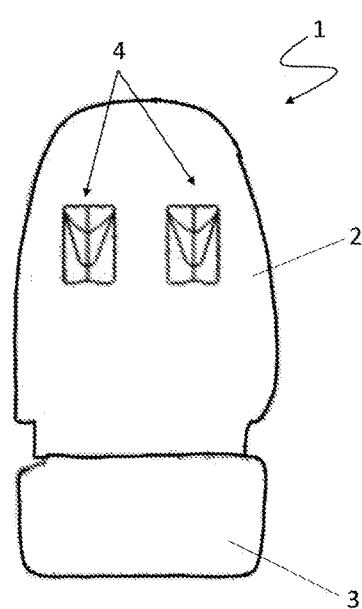
FIG. 1 is a front view of a motor vehicle seat according to the invention.

The motor vehicle seat 1 according to the invention, as shown schematically in FIG. 1, comprises a seat part 3 and a backrest 2 in a known manner. In the example shown, at least one fluid-fillable hollow body 4 is arranged on the backrest 2 in the region of the backrest. In the illustration shown, two of these hollow bodies 4 are arranged at the level of the shoulder of a potential seat occupant. Such a fluid-fillable hollow body 4 is usually connected to the backrest 2 in a suitable manner.

Figure 2:
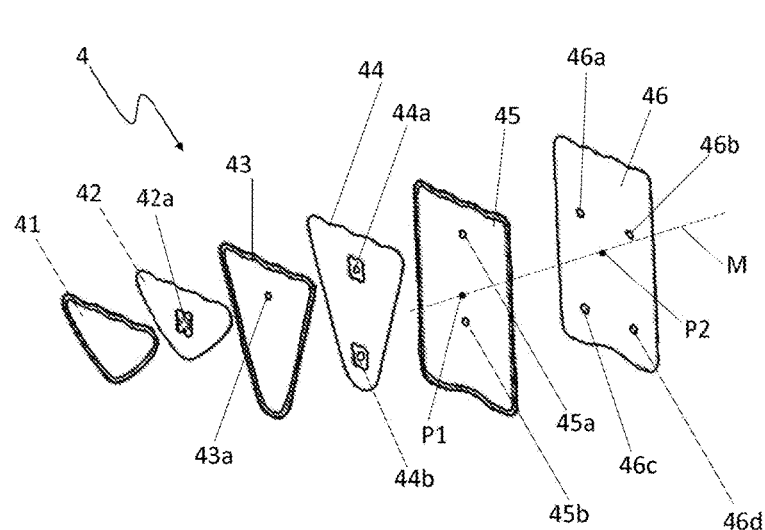
FIG. 2 is an exploded view of a hollow body according to the invention.

In principle, one or a plurality of such fluid-fillable hollow bodies 4 can be arranged on the backrest 2 and/or seat part 3 of the motor vehicle seat 1 according to the invention. An exemplary structure of such a fluid-fillable hollow body 4 will now be explained in more detail with reference to FIG. 2. This shows an exploded view in which the fluid-fillable hollow body 4 is composed of a plurality of chambers, wherein three chambers are provided in the example shown. However, there can also be two or more than three chambers. Each chamber is preferably formed by two walls 41, 42 or 43, 44 or 45, 46, preferably made of thermoplastic films, which are connected to one another along a connecting line. Preferably, at least when thermoplastic materials are used, the relevant walls of a chamber are welded along the connection line mentioned. The lowermost chamber formed by the walls 45 and 46 is preferably rectangular in shape. A center axis perpendicular to these walls can be defined by the respective center points P1 of the wall 45 and P2 of the wall 46. The additional chambers in the example shown are approximately triangular or trapezoidal. In the lower wall 46 of the lowermost chamber, openings 46*a* to 46*d* are provided through which a fluid, preferably air, enters the hollow body 4 via an external line (cf. reference 5 in FIG. 3), for example via a pump or a valve block, into the hollow body 4 or is evacuated therefrom. In order to supply the other chambers with the fluid, two passages 45*a* and 45*b*, which are aligned with corresponding passages 44*a* and 44*b* in the wall 44 of the additional chamber, are shown here by way of example in the wall 45. Furthermore, a passage 43*a* is provided in the wall 43, and is correspondingly aligned with the passage 42*a* in the wall 42 of the next chamber. Even if a three-chamber system is shown here, fewer than three chambers or more than three chambers can of course also be used.

In what follows and in FIGS. 3-6, the chambers are simplified to A (uppermost chamber formed by the walls 41 and 42), B (central chamber formed by the walls 43 and 44) and C (lowermost chamber formed by the walls 45 and 46).

FIG. 3 is a top view of the hollow body 4 in the (at least partially) evacuated position. M denotes the center axis of the lowermost chamber C, and P denotes the point of the uppermost chamber A which exerts the greatest lift during the filling process, and thus is furthest away from M as the hollow body 4 is filled further. As already mentioned, the chamber A and the chamber B are preferably approximately triangular or trapezoidal, preferably with rounded corners. As can be seen in FIG. 4, the bases or base sides of the chambers A, B, C, namely the sides A1, B1, C1, lie approximately one above the other in the evacuated or at least partially evacuated state. L denotes the lift vector, i.e., lift length and lift direction in relation to the center point P1, P2 or the center axis M. a denotes the angle of the lift vector L relative to the center axis M.

Figure 5:
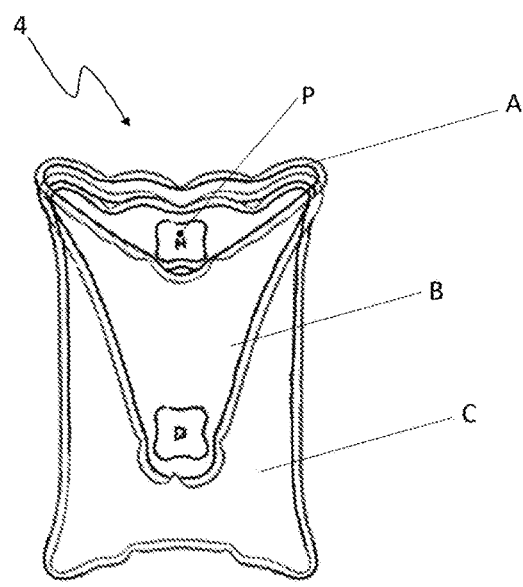
FIG. 5 is a top view of a hollow body according to the invention in the filled state.
Figure 6:
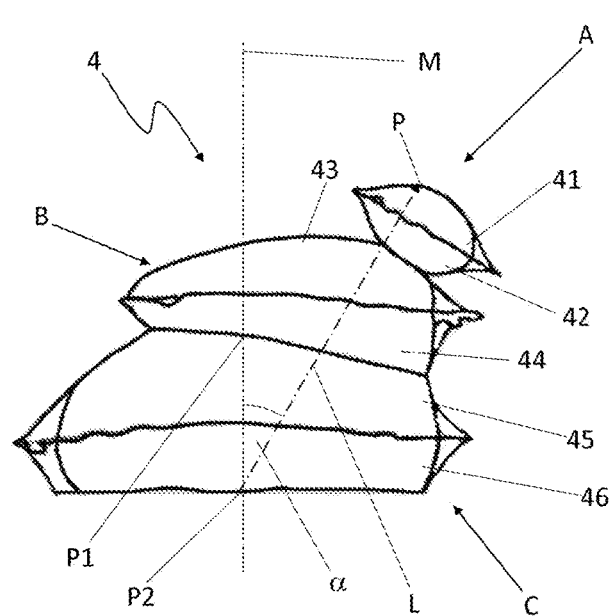
FIG. 6 is a side view of the hollow body according to the invention in the filled state.

If the hollow body 4 is now filled, for example through a fluid line 5, the individual chambers A, B, C expand as shown in FIGS. 5 and 6.

It can be seen that the lift vector L has become significantly longer compared with the state in FIG. 4, so that the point P has moved further away from the center P1, P2 of the lowermost chamber C.

In this way it is possible to create a hollow body 4 which does not perform a lifting movement running parallel to the center line M, but a lifting movement with a lifting direction running at an angle to the center line M. This opens up new possibilities that are particularly advantageous when the invention is used in a motor vehicle seat 1 as a shoulder support system or shoulder massage system.

What is claimed is:

1. A motor vehicle seat (1) comprising a backrest (2) and a seat part (3), having at least one flexible, fluid-fillable hollow body (4) attached to the seat part (3) or the backrest (2) and having at least two chambers (A, B, C) that are in fluid communication with one another, wherein the chambers (A, B, C) are arranged one on top of the other and have in their walls (42, 43, 44, 45) corresponding passages (42*a*, 43*a*, 44*a*, 44*b*, 45*a*, 45*b*) which enable a fluid exchange between the chambers (A, B, C), wherein the chambers (A, B, C) are firmly connected to one another in the region of the passages, wherein the volume of the lowermost chamber (C) adjacent to the seat part (3) or the backrest (2) is the largest and the volume of each additional chamber (A, B) is smaller compared with the volume of the chamber below it, wherein the chambers (A, B, C) are arranged one on top of the other in such a way that the maximum lift (P) of the fluid-fillable hollow body (4) when it is being filled with fluid is outside the center (M, P1, P2) of the lowermost chamber (C).

2. The motor vehicle seat (1) according to claim 1, wherein at least one of the additional chambers (A, B) has an approximately triangular or trapezoidal shape.

3. The motor vehicle seat (1) according to claim 2, wherein in the unfilled state of the fluid-fillable hollow body (4) one side of the lowermost chamber (C) and the base side(s) or the longer of the base side (s) of the additional chamber(s) are arranged approximately one above the other.

4. The motor vehicle seat (1) according to claim 1, wherein a lower wall (46) of the lowermost chamber (C) has at least one inlet opening (46a-46d) connected to a fluid line (5).

5. The motor vehicle seat (1) according to claim 1, wherein the fluid-fillable hollow body (4) has three chambers.

6. The motor vehicle seat (1) according to claim 1, wherein the lowermost chamber (C) has an approximately rectangular shape.

7. The motor vehicle seat (1) according to claim 1, wherein the number of passages between the chambers (A, B, C) decreases from the lowermost chamber (C) to the uppermost chamber (A).

8. The motor vehicle seat (1) according to claim 1, wherein each chamber (A, B, C) is formed by two walls (41, 42; 43, 44; 45, 46) made of plastics film connected to one another circumferentially along an outer edge.

9. The motor vehicle seat (1) according to claim 1, wherein the fluid-fillable hollow body (4) is arranged on the backrest (2) and is part of a shoulder support system or a shoulder massage system.

10. The motor vehicle seat (1) according to claim 4, wherein the number of passages between the chambers (A, B, C) decreases from the lowermost chamber (C) to the uppermost chamber (A).

11. The motor vehicle seat (1) according to claim 4, wherein the fluid-fillable hollow body (4) is arranged on the backrest (2) and is part of a shoulder support system or a shoulder massage system.

12. The motor vehicle seat (1) according to claim 10, wherein the fluid-fillable hollow body (4) is arranged on the backrest (2) and is part of a shoulder support system or a shoulder massage system.

13. The motor vehicle seat (1) according to claim 4, wherein the number of passages between the chambers (A, B, C) decreases from the lowermost chamber (C) to the uppermost chamber (A).

14. The motor vehicle seat (1) according to claim 13, wherein the fluid-fillable hollow body (4) is arranged on the backrest (2) and is part of a shoulder support system or a shoulder massage system.

* * * * *